United States Patent
Baylot et al.

(10) Patent No.: US 8,641,325 B2
(45) Date of Patent: Feb. 4, 2014

(54) CLAMP ASSEMBLY FOR A LAYING TOWER

(75) Inventors: Michel Baylot, Marghera (IT); Nicolas Boutin, Marseilles (FR)

(73) Assignee: Saipem S.p.A., San Donato Milanese (IT)

( * ) Notice: Subject to any disclaimer, the term of this patent is extended or adjusted under 35 U.S.C. 154(b) by 23 days.

(21) Appl. No.: 13/131,858

(22) PCT Filed: Nov. 27, 2009

(86) PCT No.: PCT/IB2009/007572
§ 371 (c)(1),
(2), (4) Date: Sep. 13, 2011

(87) PCT Pub. No.: WO2010/061280
PCT Pub. Date: Jun. 3, 2010

(65) Prior Publication Data
US 2012/0177443 A1    Jul. 12, 2012

(30) Foreign Application Priority Data
Nov. 28, 2008 (IT) ............... MI2008A2120

(51) Int. Cl.
*F16L 1/12* (2006.01)
(52) U.S. Cl.
USPC ............................. 405/168.4; 405/166
(58) Field of Classification Search
USPC ............ 405/158, 165–167, 168.4, 170; 175/423; 166/378, 380, 77.1, 77.51, 166/85.1, 75.14
See application file for complete search history.

(56) References Cited

U.S. PATENT DOCUMENTS

| | | | | |
|---|---|---|---|---|
| 3,140,523 A | * | 7/1964 | Taylor, Jr. | 294/102.2 |
| 3,508,410 A | * | 4/1970 | Lynch | 405/190 |
| 4,093,042 A | * | 6/1978 | Pradon | 188/67 |
| 4,715,456 A | * | 12/1987 | Poe et al. | 175/423 |
| 5,335,756 A | * | 8/1994 | Penisson | 188/67 |
| 5,451,084 A | * | 9/1995 | Jansch | 166/77.53 |

(Continued)

FOREIGN PATENT DOCUMENTS

| | | |
|---|---|---|
| GB | 2 364 758 | 2/2002 |
| GB | 2 370 335 | 6/2002 |
| WO | WO 01/35011 | 5/2001 |
| WO | WO 2006/027189 | 3/2006 |
| WO | WO 2007/015642 | 2/2007 |

OTHER PUBLICATIONS

International Search Report and Written Opinion for International Appl. No. PCT/IB2009/007572, European Patent Office, The Netherlands, mailed on Apr. 6, 2010, 9 pages.
International Preliminary Report or Patentability for International Appl. No. PCT/IB2009/007572, European Patent Office, The Netherlands, mailed Jan. 13, 2011, 18 pages.

*Primary Examiner* — Thomas B Will
*Assistant Examiner* — Jessica H Lutz
(74) *Attorney, Agent, or Firm* — Sterne, Kessler, Goldstein & Fox P.L.L.C.

(57) ABSTRACT

A clamp assembly, for a laying tower for laying continuous, elongated members in a body of water, has a supporting frame; and three clamping units arranged in series to simultaneously clamp and release a continuous, elongated member extending along a given axis, and each having at least two opposite jaws, and self-adjusting mechanisms, each of which is interposed between a respective jaw and the supporting frame, has a spring, and allows an adjustment movement of the respective jaw with respect to the supporting frame in a direction parallel to the axis, under the weight of the continuous, elongated member, and in opposition to the spring, when the continuous, elongated member is gripped simultaneously by the clamping units.

16 Claims, 5 Drawing Sheets

(56) References Cited

U.S. PATENT DOCUMENTS

| | | | |
|---|---|---|---|
| 5,484,040 A * | 1/1996 | Penisson | 188/67 |
| 6,588,981 B2 * | 7/2003 | Willis et al. | 405/168.1 |
| 6,631,792 B2 * | 10/2003 | Buck | 188/67 |
| 2002/0096611 A1 * | 7/2002 | Meuth et al. | 248/230.8 |
| 2011/0188941 A1 * | 8/2011 | Tame | 405/166 |

\* cited by examiner

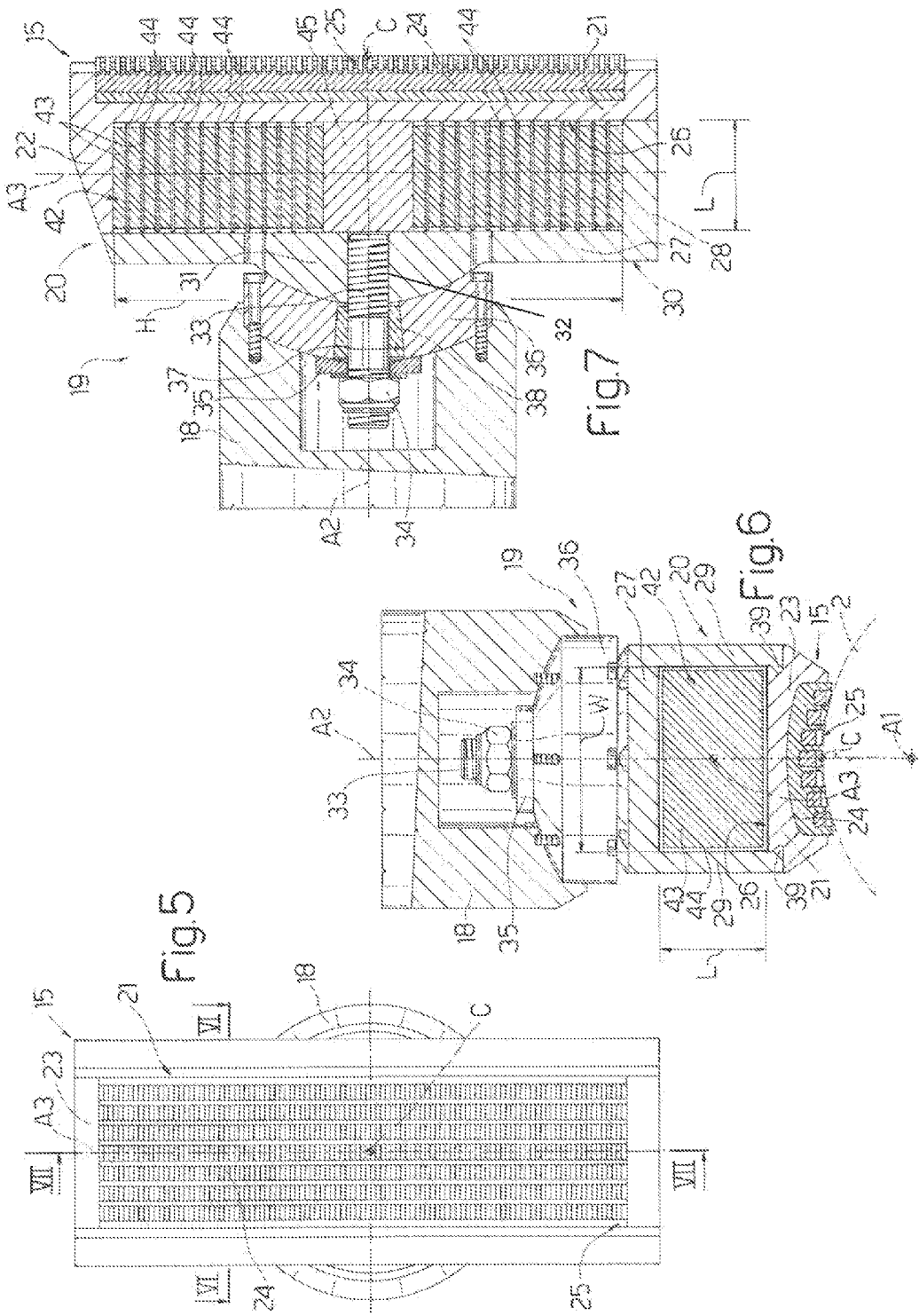

CLAMP ASSEMBLY FOR A LAYING TOWER

TECHNICAL FIELD

The present invention relates to a clamp assembly for a laying tower for laying continuous, elongated members, such as underwater pipelines and cables, in a body of water.

More specifically, the present invention relates to a clamp assembly for a vessel-mounted laying device for step-laying a continuous, elongated member in a body of water.

Though specific reference is made in the following description to underwater pipelines, for the purpose of the present invention, the term "continuous, elongated member" includes both underwater pipelines normally used for, transporting hydrocarbons, and underwater electric power cables.

BACKGROUND ART

An underwater pipeline is normally assembled on the laying vessel, is laid, as it is assembled, directly off the vessel, and comprises a number of pipes joined to cover distances of hundreds of kilometers. In view of the length of underwater pipelines and cables in this type of application, they are referred to as "continuous".

With specific reference to underwater pipelines, the pipes are of standard length, normally 12 meters, range in diameter from 0.2 to 1.5 meters, and each comprise a steel cylinder; a polymer coating to protect the steel cylinder from corrosion and heat loss; and possibly a concrete or Gunite coating to weigh the pipe down.

The pipes are joined both at on-land installations to form multiple-unit-length pipes, and on laying vessels, on which the pipes, of unit or multiple-unit length, are joined to pipes already joined to others to form the pipeline, which is laid on the bed of the body of water from the laying vessel.

Underwater pipelines are assembled and laid from laying vessels in two ways, each with its own merits, depending on the depth of the bed.

A first method is to form the pipeline on a vertical assembly line, and lay it in a substantially vertical position, so the portion of the pipeline between the laying vessel and the bed assumes a J shape. This method is particularly suitable for laying pipelines on very deep beds.

A second method is to form the pipeline on a substantially horizontal assembly line, and lay it using a laying device which, in the work position, serves to guide and support the pipeline along a curved path having a first portion above water, and a second portion below water. Pipelines laid using this method assume an S shape between the laying vessel and bed.

Regardless of which method is employed, relative movement between the pipeline, or continuous, elongated member in general, and the laying vessel must always be controlled by the laying device.

The first method jogs the continuous, elongated member in a laying direction, and comprises the steps of: clamping the continuous, elongated member by means of a first clamp assembly comprising jaws and fixed to the laying tower; clamping the continuous, elongated member by means of a second clamp assembly comprising jaws and movable with respect to the laying tower; releasing the first clamp assembly from the continuous, elongated member; moving the second clamp assembly in the laying direction together with the continuous, elongated member; clamping the first clamp assembly; releasing the second clamp assembly; moving the second clamp assembly in the opposite direction to the laying direction; and repeating the above steps from the beginning to jog down one more step.

This type of laying device is substantially described in Patent Applications GB 2,364,758; GB 2,370,335; WO 2006/02719; and WO 2007/015642.

The degree to which the continuous, elongated member is clamped firmly and prevented from moving with respect to the laws substantially depends on the amount of friction between the jaws and the continuous, elongated member, how strongly the clamp assemblies grip the continuous, elongated member, and the total contact area between the jaws and the continuous, elongated member.

Only so much pressure, however, can be exerted on the outer surface of the continuous, elongated member, over and above which, the jaws could damage the continuous, elongated member at the clamping point.

Working with deep beds and exceptionally heavy continuous, elongated members per unit length poses a critical operating condition, in which the continuous, elongated member suspended between the bed and the laying device calls for considerable total clamping force.

In many cases, operating conditions therefore call for increasing the size of the jaws, but this also has its physical limits.

To overcome this drawback, friction bearings have been proposed, made of polymer material, in which aluminium bosses are embedded to improve grip. One example of this is disclosed in U.S. Pat. No. 3,754,474, in which grip is improved by bosses embedded in the polymer material.

This solution, however, is also not without drawbacks, such as rapid wear of the friction bearings, caused by inclusion of the metal bosses, and, in some cases, the real danger of damaging the continuous, elongated member.

Document WO 2007/015642 A2 discloses a clamping system comprising a first clamping assembly having a movable clamping unit and a fixed clamping unit of the wedge-shaped self-locking type. Each clamping unit comprises an annular clamping block with a conical seat; clamping jaws with conical outer faces; and rubber layers interposed between the jaws and the conical seat. The rubber layer can slide with respect to the conical seat and undergo compression and shear stresses.

This type of clamping system does not provide any particular advantage in increasing the grip with the continuous, elongated member and has the drawback that the jaws are suspended by rubber layers heavily stressed.

To overcome these drawbacks, clamp assemblies are known, as described for example in GB 2,364,758, which comprise at least two clamping units arranged in series and simultaneously gripping two separate portions of the continuous, elongated member, thus doubling the total contact area between the clamp assembly and the continuous, elongated member, while still remaining within jaw size and maximum pressure recommendations.

This solution, however, is also not without its drawbacks, owing to the load exerted by the continuous, elongated member on the clamp assembly not being evenly distributed between the two clamping units. In fact, the first clamping unit in the laying direction absorbs most of the load exerted by the continuous, elongated member on the clamp assembly, which means even clamp assemblies with a number of clamping units fail to completely eliminate slippage and so ensure firm grip.

Document WO 01/35011 discloses a clamping system of the above-identified type wherein each jaw is connected to a piston by a wedge mechanism with the interposition of a rubber layer. This solution achieves a more uniform distribution of the forces between the clamping units. However, this solution does not avoid the slippage of the continuous, elongated member, has the drawback of exerting an excessive force on the continuous, elongated member up to damage the continuous, elongated member, and the rubber layer undergoes shear stresses.

DISCLOSURE OF INVENTION

It is one object of the present invention to provide a clamp assembly designed to improve distribution of the total clamping force of the clamp assembly, and to eliminate the drawbacks of the known art.

Another object of the present invention is to provide a straightforward clamp assembly capable of retaining exceptionally heavy continuous, elongated members with no slippage.

According to the present invention, there is provided a clamp assembly for a laying tower for laying continuous, elongated members, such as underwater pipelines and cables, in a body of water, the clamp assembly comprising a supporting frame; and at least two clamping units arranged in series to simultaneously clamp and release a continuous, elongated member extending along a given axis, and each comprising at least two opposite jaws, and self-adjusting mechanisms, each of which is interposed between a respective jaw and the supporting frame, comprises an elastic member, and allows an adjustment movement of the respective jaw with respect to the supporting frame in a direction parallel to said axis, under the weight of the continuous, elongated member, and in opposition to the elastic member, when the continuous, elongated member is gripped simultaneously by all the clamping units; wherein the self-adjusting mechanism comprises a connecting member connected directly to the jaw and designed to form a sliding coupling with the jaw; said elastic member being located between the jaw ad the connecting member to oppose slide of the jaw, under the weight of the continuous, elongated member, with respect to the connecting member.

The adjustment movement provided for by the present invention serves to improve distribution of the total clamping force between the various jaws of the clamp assembly. At the same time the elastic member has no structural function and can be design to undergo pure compression stress. Further the clamping forces can be maintained under control.

Another object of the present invention is to provide a method of laying a continuous, elongated member.

According to the present invention, there is provided a method of laying a continuous, elongated member in a body of water by means of a laying vessel; the method providing for jogging the continuous, elongated member in a laying direction, and comprising the steps of: clamping the continuous, elongated member, extending along an axis, by means of a first clamp assembly fixed to a laying tower and comprising at least two clamping units arranged in series for simultaneously clamping and releasing the continuous, elongated member; and clamping the continuous, elongated member by means of a second clamp assembly movable with respect to the laving tower and comprising at least two clamping units arranged in series for simultaneously clamping and releasing the continuous, elongated member; each clamping unit comprising at least two opposite jaws for selectively clamping and releasing the continuous, elongated member, and self-adjusting mechanisms, each of which is connected to a respective jaw, comprises an elastic member, and allows an adjustment movement of the respective jaw in a direction parallel to the axis, under the weight of the continuous, elongated member, and in opposition to the elastic member; the method comprising the step of making a controlled adjustment movement in the direction parallel to axis of the second clamp assembly with respect to the first clamp assembly, when the continuous, elongated member is gripped simultaneously by the first and second clamp assembly.

The controlled adjustment movement thus guides the adjustment movement of the jaws, and prevents jerking of the continuous, elongated member which may result in slippage.

BRIEF DESCRIPTION OF THE DRAWINGS

A non-limiting embodiment of the present invention will be described by way of example with reference to the accompanying drawings, in which:

FIG. 5 shows a front view, with parts removed for clarity, of a detail of the FIG. 2 laying device;

FIG. 6 shows a section, with parts removed for clarity, of the FIG. 5 detail along line VI-VI;

FIG. 7 shows a longitudinal section, with parts removed for clarity, of the FIG. 5 detail along line VII-VII.

BEST MODE FOR CARRYING OUT THE INVENTION

The Laying Vessel

Figure 1:
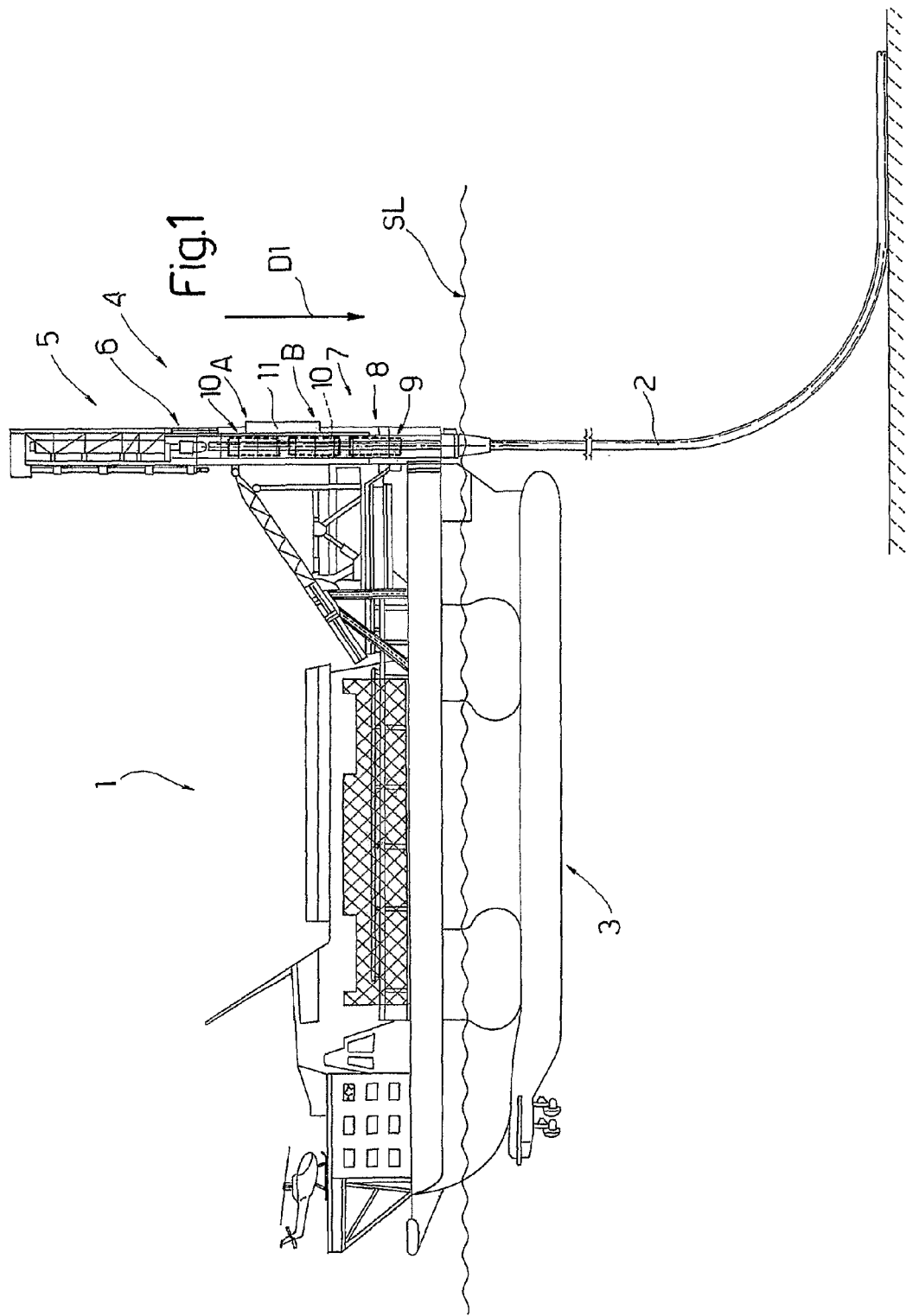
FIG. 1 shows a side view, with parts removed for clarity, of an underwater-pipeline laving vessel comprising a laying device in accordance with the present invention.

Number 1 in FIG. 1 indicates a laying vessel for laying a continuous, elongated member 2—in the example shown, an underwater pipeline comprising pipes (not shown) joined together on laying vessel 1—in a body of water (SL indicates the level of the body of water).

Laying vessel 1 comprises a semisubmersible ship 3; and a laying tower 4 which extends in a laying direction D1, is hinged to semisubmersible ship 3, and is designed for J-laying the pipeline onto the bed of the body of water. Though shown in the vertical position, laying tower 4 can be tilted up to 30° with respect to the vertical position when laying the pipeline.

Laying tower 4 comprises a top portion 5 where the pipeline is assembled; and intermediate portion 6 housing a track tensioner (not shown); and a bottom portion 7 housing a laying device 8.

The Continuous, Elongated Member

Figure 2:
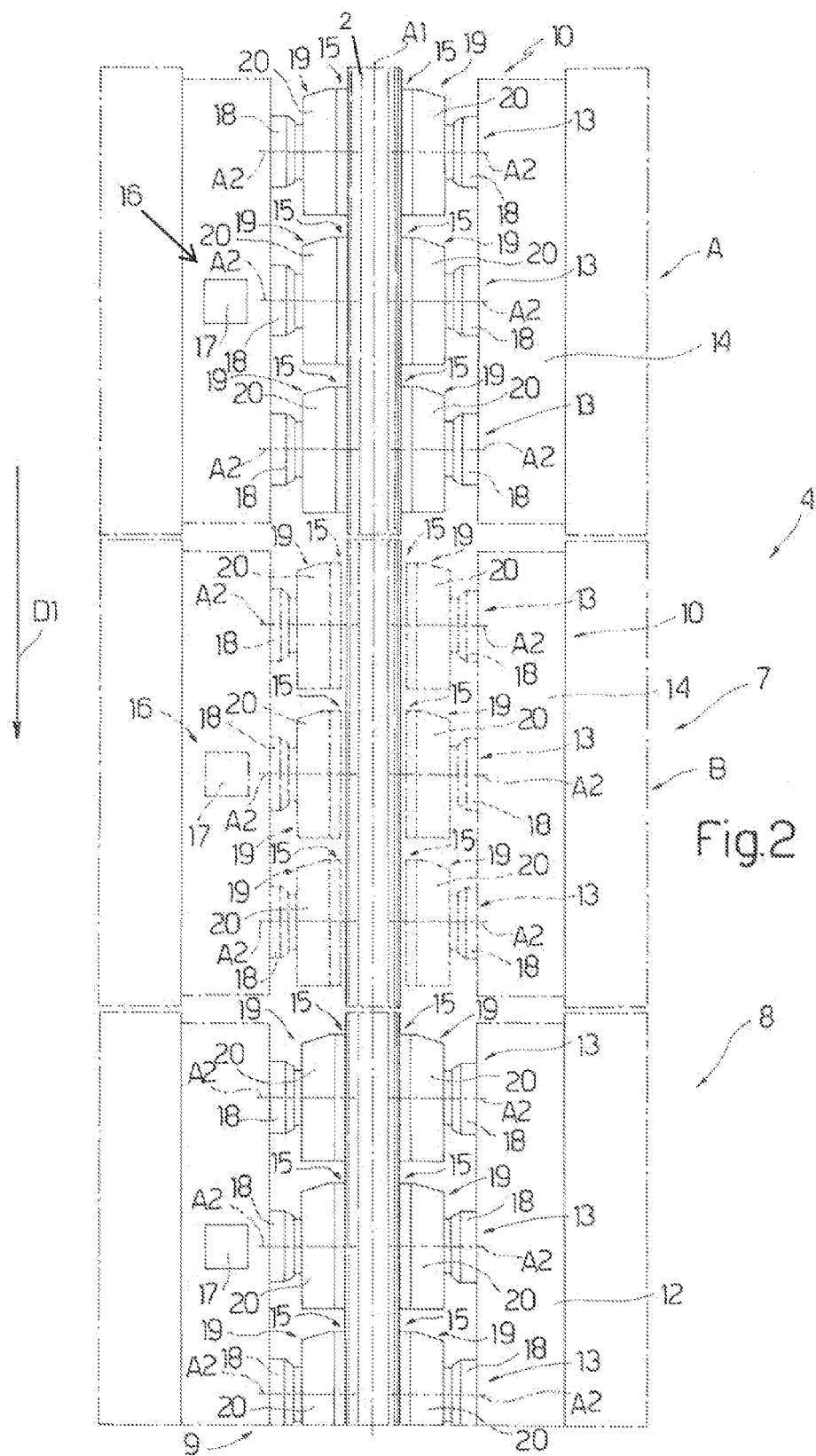
FIG. 2 shows a partly sectioned side view, with parts removed for clarity, of a detail of the laying device according to the present invention.

With reference to FIG. 2, continuous, elongated member 2 travels through laying device 8 (see also FIG. 1), in which it extends along a given axis A1 parallel to laying direction D1. In the example shown in the drawings, continuous, elongated member 2 is defined by an underwater pipeline comprising a metal cylinder, and a protective coating of deformable polymer material about the metal cylinder. That is, the protective coating is more deformable than the metal cylinder.

The term "protective coating" includes both corrosion-proof coatings, which are relatively thin (a few millimeters) and made of PP (polypropylene) or PE (polyethylene); and insulating coatings, which combine corrosionproofing and thermal insulation, may be as much as a few tens of millimeters in thickness, and are normally made of solid PU (polyurethane) or multilayer PP (polypropylene).

In some cases, the pipeline is weighed down with a concrete or Gunite coating on top of the protective coating.

Though specific reference is made in the present disclosure to a conventional single underwater pipeline, it is understood that the present invention also applies to underwater pipelines comprising two pipelines, one inside the other (pipe-in-pipe), and to underwater cables.

The Laying Device

With reference to FIG. 2, laying device 8 surrounds the continuous, elongated member 2 being laid, and is fitted to laying tower 4.

Laying device 8 comprises a clamp assembly 9 fixed to laying tower 4 to cyclically grip and release continuous, elongated member 2; and a clamp assembly 10 for cyclically gripping and releasing continuous, elongated member 2, and which is moved along laying tower 4, in a direction parallel to laying direction D1 and between two positions A and B (FIG. 2), by an actuator 11 (FIG. 1) connected to laying tower 4 and clamp assembly 10.

With reference to FIG. 2, clamp assembly 9 comprises a supporting frame 12 fixed to laying tower 4; and three clamping units 13 fitted to supporting frame 12 in series in laying direction D1. And clamp assembly 10 comprises a supporting frame 14 movable up and down laying tower 4 in laying direction D1; and three clamping units 13 fitted to supporting frame 14 in series in laying direction D1.

The present invention generally relates to clamp assemblies 9, 10, each comprising at least two clamping units 13, and, in a preferred embodiment, six clamping units arranged in series in laying direction D1. The preferred embodiment is not shown, simply for the sake of simplicity.

As shown in FIG. 2, the three clamping units 13 of clamp assembly 9 are preferably equally spaced along supporting frame 12 in laying direction D1; and, likewise, the clamping units of clamp assembly 10 are preferably equally spaced along supporting frame 14 in laying direction D1.

Each clamping unit 13 comprises at least two opposite jaws 15 to exchange a clamping force F with the continuous, elongated member. In the FIGS. 3 and 4 example and the preferred embodiment, each clamping unit 13 comprises six jaws 15 forming three opposite pairs and equally spaced radially about axis A1 of continuous, elongated member 2.

Figure 4:
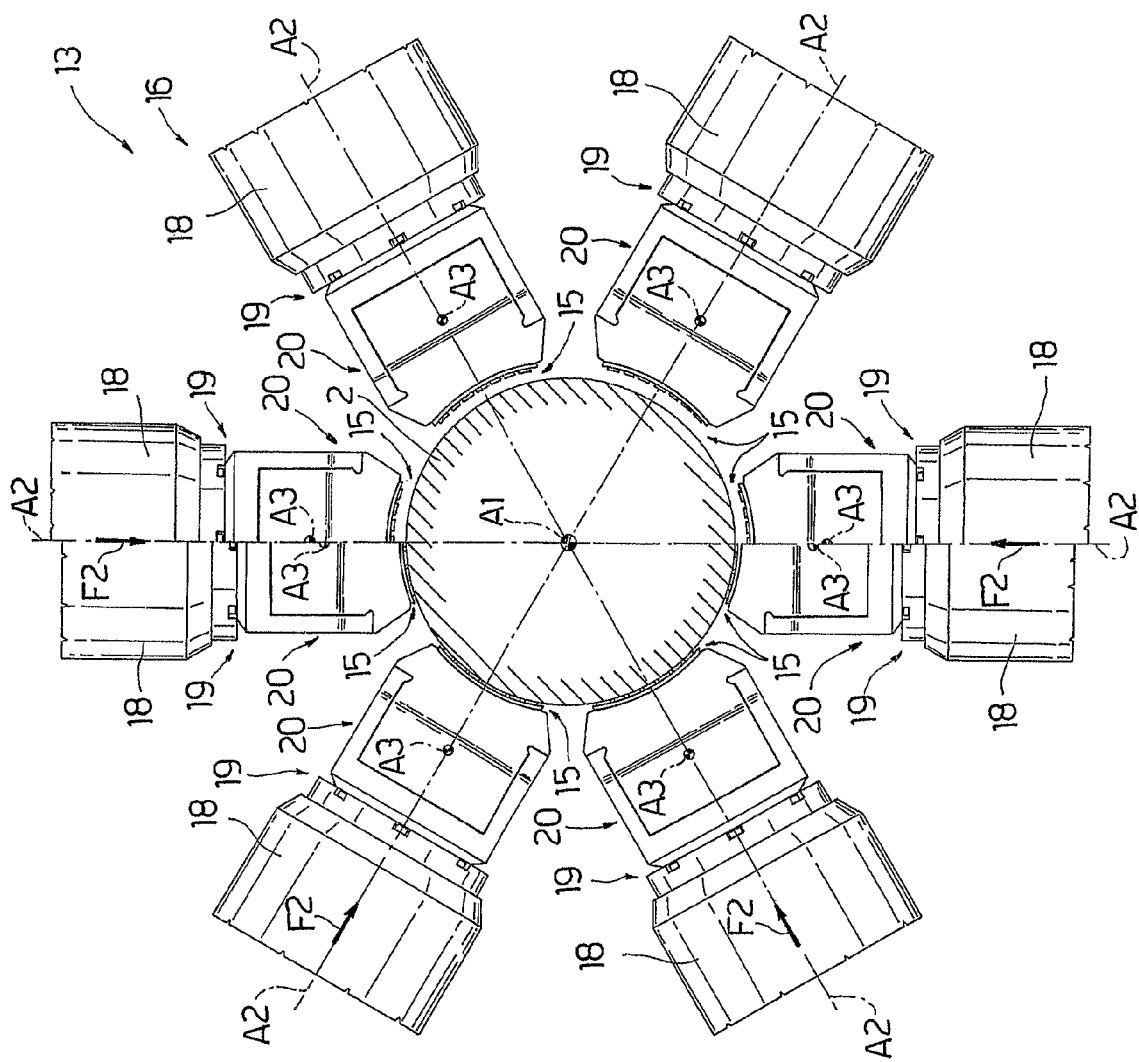
FIG. 4 shows a larger-scale plan view, with parts removed for clarity, of a detail of the FIG. 2 laying device.

Each clamp assembly 9, 10 comprises an actuator 16 for selectively clamping all of jaws 15 onto continuous, elongated member 2 (left half of FIG. 4), and for releasing all of jaws 15 from continuous, elongated member 2 (right half of FIG. 4).

With reference to FIG. 2, actuator 16 comprises a valve assembly 17; and hydraulic cylinders 18, each of which extends along an axis A2 and has a first end fixed to supporting frame 12, 14 (FIG. 2), and a second end connected to a respective jaw 15.

Each clamp assembly 9, 10 comprises self-adjusting mechanisms 19, each of which connects the second end of a respective hydraulic cylinder 18 to a respective jaw 15, and comprises a universal joint—in the example shown, a spherical joint—and a sliding coupling. Each self-adjusting mechanism 19 also comprises a connecting member 20, which is connected to hydraulic cylinder 18 by a spherical coupling, and to jaw 15 by a sliding coupling.

With reference to FIG. 5, jaw 15 is defined by a metal bracket extending predominantly along an axis A3, and comprising a front wall 21 parallel to axis A3, and a top wall 22 (FIG. 7) substantially perpendicular to front wall 21. Front wall 21 comprises a friction bearing 24 which partly defines a curved outer face 25 with the same curvature as continuous, elongated member 2 (FIG. 6). With reference to FIG. 6, wall 21 has an inner face 26 dovetailed to form a sliding joint—in a direction parallel to axis A—with connecting member 20.

Figure 3:
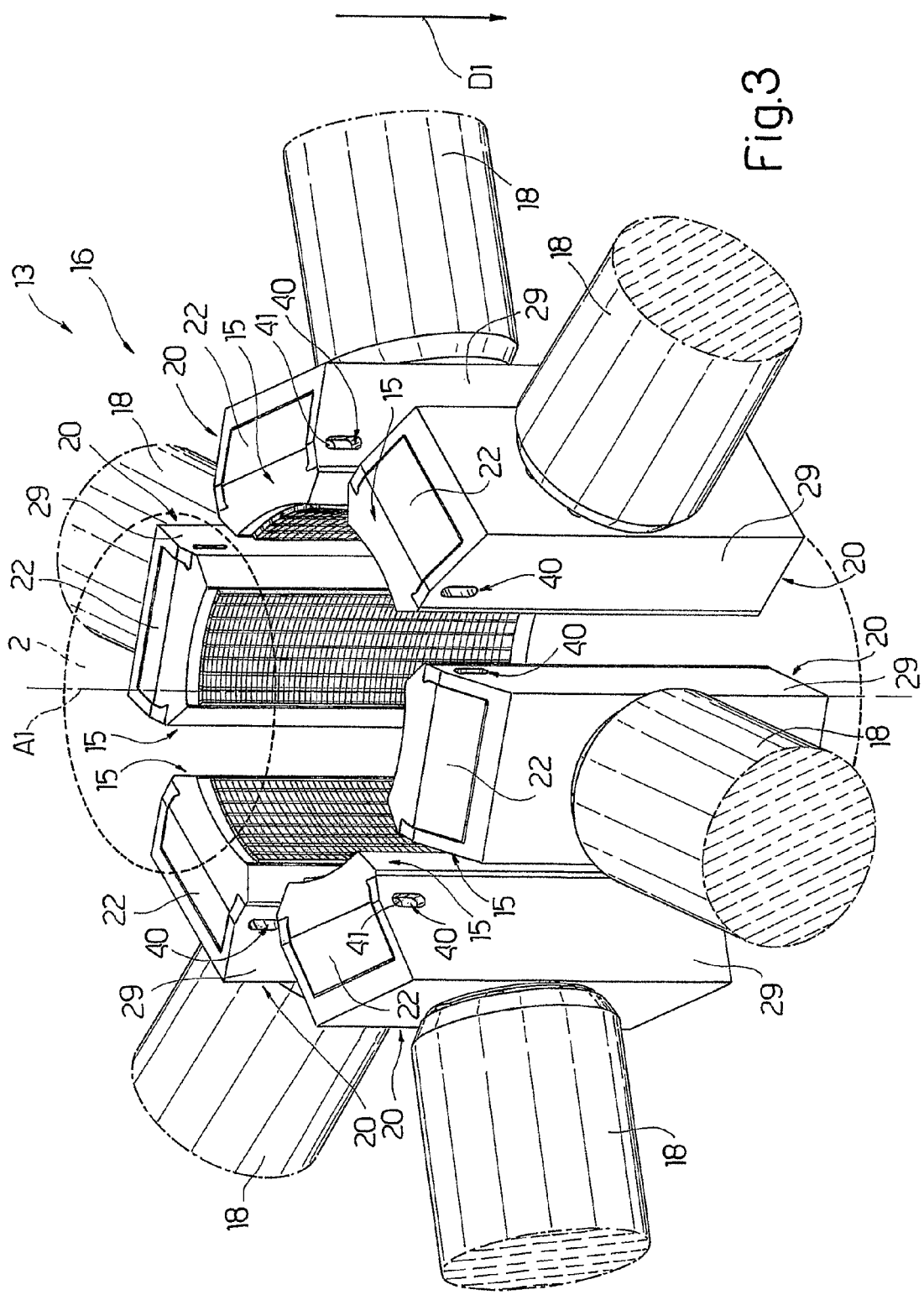
FIG. 3 shows a larger-scale, partly sectioned isometric view, with parts removed for clarity, of a detail of the FIG. 2 laying device.

With reference to FIG. 7, connecting member 20 is a metal box comprising a rear wall 27, a bottom wall 28, and two lateral walls 29 (FIG. 6); and jaw 15 and connecting member 20 are complementary, so as to form a parallelepiped when joined (FIG. 3).

Rear wall 27 has an outer face 30 that substantially flat, except for a spherical-cap-shaped boss 31, which characterizes the centre portion of outer face 30, and the centre C of which lies along outer face 25 of jaw 15. Rear wall 27 also has a threaded hole 32 in the centre of boss 31 and engaged by a stud 33 fitted on the opposite side with a nut 34 and a counterplate 35.

Hydraulic cylinder 18 is connected to rear wall 27 of connecting member 20. In the FIG. 7 example, the second end of hydraulic cylinder 18 has a spherical-cap-shaped plate 36 fastened between boss 31 and counterplate 35 by stud 33 and nut 34, and having a hole 37 housing a sleeve 38 of elastic material, preferably rubber.

Connecting member 20 and, hence, jaw 15 can therefore oscillate angularly to a limited extent, with respect to hydraulic cylinder 18, about a given point which, in the example shown, is centre C.

With reference to FIG. 6, each lateral wall 29 comprises a rib 39, which is partly complementary to inner face 26 of the front wall to only permit relative movement between connecting member 20 and jaw 15 in a direction parallel to axis A3 (FIG. 7). With reference to FIG. 3, each lateral wall 29 comprises a slot 40 on a level with top wall 22; and a screw 41 fitted to top wall 22 limits movement between jaw 15 and connecting member 20 to the length of slot 40.

With reference to FIG. 3, connecting member 20 and jaw 15 are connected directly in sliding manner to each other, and substantially form a parallelepiped-shaped body, and a closed, parallelepiped-shaped inner compartment 42 (FIGS. 6 and 7) of height H (FIG. 7), width W, and length L (FIG. 6).

With reference to FIG. 7 each self-adjusting mechanism 19 comprises at least one spring, in particular a compression spring, located between jaw 15 and connecting member 20, and operating elastically in a direction parallel to axis A3. In the FIG. 7 example, the compression spring is housed in compartment 42, and comprises at least one elastic member 43, and preferably a stack of elastic members 43 and plates 44—in the example shown, elastic panels alternating with metal plates 44.

In actual use, elastic member 43—or, rather, each elastic member 43 in the stack—is compressed between top wall 22 of jaw 15 and bottom wall 28 of connecting member 20.

With reference to FIG. 7, the stack is divided into a top portion and a bottom portion by a thrust block 45 located along axis A2 and substantially of length P and width W (FIG. 6). The force exerted by hydraulic cylinder 18 is substantially transferred from connecting member 20 to jaw 15 by thrust block 45, so as to relieve the sliding connection between ribs 39 (FIG. 6) and jaw 15 of as much stress as possible crosswise to the sliding direction.

With reference to FIG. 6, preferably, plates 44 are substantially of width W and length L, and elastic members 43 are narrower and shorter, to allow them to expand, and are much thicker (FIG. 7) than plates 44 (in the height direction parallel to axis A3).

Plates 44 are preferably made of titanium, and elastic members 43 of rubber or polyurethane.

All the materials are treated to operate in salty environments.

More specifically, jaw 15 and connecting member 20 are made of steel, and the mutually sliding surfaces of jaw 15 and connecting member 20 are coated with Xylan® or ceramic, or are ion-nitrided.

In a variation, connecting member 20 is made of steel, with sliding surfaces coated with Xylan®, and jaw 15 is made of a copper-aluminium alloy.

Operation of the Laying Device

With reference to FIG. 2, laying device 8 jogs continuous, elongated member 2 in laying direction D1. The downward movement of continuous, elongated member 2 is performed by clamp assembly 10, which is moved by actuator 11 (FIG. 1) from position A to position B. Continuous, elongated member 2 is then gripped by clamp assembly 9 and released by clamp assembly 10, which returns to position A to grip another portion of continuous, elongated member 2.

The above operations are repeated cyclically to jog continuous, elongated member 2 in laying direction D1.

Jaws 15 of each clamping unit 13 are operated by actuator 16. In the example shown, each jaw 15 is connected to respective hydraulic cylinder 18 by self-adjusting mechanism 19, which provides for orienting jaw 15 about centre (FIG. 6), positioning axis A3 parallel to axis A1, and sliding jaw 15, in a direction parallel to axes A3 and A2, with respect to respective supporting frame 12, 14 (FIG. 2).

In other words, whenever a clamping unit 13 is clamped onto continuous, elongated member 2, each jaw 15 adjusts automatically to any irregularity of the outer surface of continuous, elongated member 2, and to any tilt in axis A1 of continuous, elongated member 2.

With reference to FIG. 4, the clamping forces F exchanged between opposite jaws 15 of each clamping unit 13 are thus distributed evenly along each jaw 15 of the clamping unit 13. Since each clamping unit 13 comprises six jaws 15 which grip the continuous, elongated member simultaneously about axis A1, angular adjustment of jaws 15 provides for distributing stress evenly between all the jaws 15 of clamping unit 13. In other words, if a jaw 15 is not positioned correctly with respect to continuous, elongated member 2, continuous, elongated member 2 could cause unbalanced stress distribution between jaws 15 of clamping unit 13.

With reference to FIG. 2, the adjustment movement of jaws 15 with respect to supporting frame 12, 14 serves to distribute, as evenly as possible between clamping units 13 of clamp assembly 9, 10, the load transmitted by continuous, elongated member 2 to clamp assembly 9, 10. For example, without self-adjusting mechanisms 19, when continuous, elongated member 2 is gripped simultaneously by all the clamping units 13 of clamp assembly 9, most of the load transmitted by the continuous, elongated member would be absorbed by clamping unit 13, and only the rest would be absorbed by the upper clamping units 13 of clamp assembly 9. And the same also applies to clamp assembly 10.

The adjustment movement or elastic yield of jaw 15 is in the order of a few tens of millimeters in laying direction D1, and provides for improving load distribution between the simultaneously clamped clamping units 13 of clamp assembly 9, 10.

Clamp assembly 10 is preferably controlled to make a controlled adjustment movement. That is, before releasing clamping units 13 of clamp assembly 10 and handing continuous, elongated member 2 over to clamp assembly 9, clamp assembly 10 makes a controlled adjustment movement equal to the estimated adjustment movement in laying direction D1, so as to precompress the compression springs of clamping units 13 of clamp assembly 9 and release the compression springs of clamping units 13 of clamp assembly 10. This prevents an uncontrolled adjustment movement under the weight of continuous, elongated member 2 and the reaction of jaws 15. Clamp assembly 10 makes a controlled adjustment movement before clamp assembly 9 releases continuous, elongated member 2. In which case, the controlled adjustment movement is made in the opposite direction to laying direction D1, to precompress the compression springs of clamp assembly 10 and release the compression springs of clamp assembly 9. Once the controlled adjustment movement is made, clamp assembly 9 releases continuous, elongated member 2, and clamp assembly 10 moves continuous, elongated member 2 in laying direction D1.

Many of the advantages of the present invention will be clear from the above description of the way it operates. Another advantage is the easy interchangeability of jaws 15 with respect to connecting member 20, and of the compression springs to adjust the rigidity of the compression springs to the characteristics of continuous, elongated member 2.

Clearly, changes may be made to the embodiment of the present invention as described herein without, however, departing from the scope of the accompanying Claims.

The invention claimed is:

1. A clamp assembly for a laying tower for laying continuous, elongated members in a body of water, the clamp assembly comprising:
   a supporting frame; and
   at least two clamping units arranged in series to simultaneously clamp and to simultaneously release a continuous, elongated member extending along a given axis, each clamping unit comprising:
      at least two opposite jaws, and
      self-adjusting mechanisms, each self-adjusting mechanism being interposed between a respective jaw and the supporting frame,
      each self-adjusting mechanism comprising at least one elastic member, and each self-adjusting mechanism being configured to allow an adjustment movement of the respective jaw with respect to the supporting frame in a direction parallel to the axis, under the weight of the continuous, elongated member, and in opposition to the elastic member, when the continuous, elongated member is gripped simultaneously by all the clamping units,
      wherein the self-adjusting mechanism comprises:
         a connecting member connected directly to the jaw and configured to form a sliding coupling with the jaw, and
         a thrust block located between the connecting member and the jaw to transfer the clamping force between the connecting member and the jaw, and
      wherein the elastic member is located between the jaw and the connecting, member to oppose sliding of the jaw, under the weight of the continuous, elongated member, with respect to the connecting member.

2. The clamp assembly as claimed in claim 1, wherein the connecting member is made of steel, and the jaw is made of steel or a copper-aluminium alloy.

3. The clamp assembly as claimed in claim 1, wherein the connecting member comprises a bottom wall, and the jaw comprises a top wall facing the bottom wall; the elastic member being located between the bottom wall and the top wall, and opposing compression between the bottom wall and the top wall.

4. The clamp assembly as claimed in claim 2, wherein the connecting member and the jaw are designed to form a compartment; the elastic member being housed in the compartment.

5. The clamp assembly as claimed in claim 1, wherein each self-adjusting mechanism comprises a stack of elastic members, and a stack of plates alternating with the elastic members.

6. The clamp assembly as claimed in claim 5, wherein the plates are thinner than the elastic members.

7. The clamp assembly as claimed in claim 5, wherein the plates are wider and longer than the elastic members.

8. The clamp assembly as claimed in claim 1, wherein each self-adjusting mechanism is connected to the supporting frame by a universal joint to allow the respective jaw to oscillate about a given point.

9. The clamp assembly as claimed in claim 8, wherein the connecting member comprises a spherical-cap-shaped boss having a center; the boss and a counterplate being clamped to a spherical-cap-shaped plate connected to the supporting frame; and the given point being the center.

10. The clamp assembly as claimed in claim 2, wherein the jaw is made of steel, and wherein sliding surfaces of the connecting member and the jaw are coated with a fluoropolymer or a ceramic, or are ion-nitrided.

11. The clamp assembly as claimed in claim 4, wherein the compartment is a closed compartment.

12. The clamp assembly as claimed in claim 5, wherein the elastic members comprise rubber or polyurethane panels, and the plates comprise metal.

13. The clamp assembly as claimed in claim 12, wherein the metal is titanium.

14. The clamp assembly as claimed in claim 1, wherein the thrust block is disposed to transfer the clamping force from the connecting member to the jaw without having the elastic member interposed between the thrust block and the connecting member or between the thrust block and the jaw.

15. The clamp assembly as claimed in claim 14, wherein the thrust block passes through the elastic member.

16. A laying device for controlled-laying a continuous, elongated member in a body of water, the laying device comprising:
   a laying tower;
   a first clamp assembly connected to the laying tower; and
   a second clamp assembly connected, to the laying tower to move selectively in a direction parallel to a laying direction;
   wherein the first and second clamp assemblies are as claimed in claim 1.

* * * * *